(12) United States Patent
Fukuhara et al.

(10) Patent No.: US 8,611,686 B2
(45) Date of Patent: Dec. 17, 2013

(54) CODING APPARATUS AND METHOD

(75) Inventors: Takahiro Fukuhara, Kanagawa (JP); Katsutoshi Ando, Kanagawa (JP); Koji Hara, Kanagawa (JP)

(73) Assignee: Sony Corporation (JP)

( * ) Notice: Subject to any disclaimer, the term of this patent is extended or adjusted under 35 U.S.C. 154(b) by 292 days.

(21) Appl. No.: 12/924,642

(22) Filed: Oct. 1, 2010

(65) Prior Publication Data
US 2011/0091121 A1 Apr. 21, 2011

(30) Foreign Application Priority Data
Oct. 21, 2009 (JP) .............................. P2009-242768

(51) Int. Cl.
*G06K 9/46* (2006.01)

(52) U.S. Cl.
USPC .......................................................... 382/234

(58) Field of Classification Search
None
See application file for complete search history.

(56) References Cited

U.S. PATENT DOCUMENTS

| | | | | |
|---|---|---|---|---|
| 6,034,690 | A * | 3/2000 | Gallery et al. ............... | 345/419 |
| 6,246,719 | B1 * | 6/2001 | Agarwal .................. | 375/240.16 |
| 6,285,790 | B1 * | 9/2001 | Schwartz ...................... | 382/234 |
| 6,483,946 | B1 * | 11/2002 | Martucci et al. ............ | 382/240 |
| 6,658,159 | B1 | 12/2003 | Taubman | |
| 6,990,245 | B2 | 1/2006 | Fukuhara et al. | |
| 7,072,519 | B2 | 7/2006 | Fukuhara et al. | |
| 7,224,844 | B2 * | 5/2007 | Otsuka ......................... | 382/239 |
| 7,333,663 | B1 | 2/2008 | Schumacher | |
| 7,519,229 | B2 * | 4/2009 | Wallace et al. .............. | 382/232 |
| 2001/0022815 | A1 * | 9/2001 | Agarwal .................. | 375/240.16 |
| 2003/0035476 | A1 * | 2/2003 | Ohyama et al. ............. | 375/240.1 |
| 2005/0123207 | A1 * | 6/2005 | Marpe et al. .................. | 382/239 |
| 2005/0135688 | A1 * | 6/2005 | Chen et al. .................... | 382/240 |
| 2006/0093226 | A1 * | 5/2006 | Gormish et al. ............. | 382/234 |
| 2007/0098276 | A1 * | 5/2007 | Reese ........................... | 382/234 |
| 2008/0131012 | A1 * | 6/2008 | Chen et al. .................... | 382/240 |
| 2008/0240587 | A1 * | 10/2008 | Au et al. ........................ | 382/236 |
| 2011/0007977 | A1 * | 1/2011 | Amonou et al. .............. | 382/233 |

FOREIGN PATENT DOCUMENTS

JP 3906630 B2 2/2002

OTHER PUBLICATIONS

European Search Report EP 10187236, dated Jul. 14, 2011.

* cited by examiner

*Primary Examiner* — Barry Drennan
*Assistant Examiner* — Feng Niu
(74) *Attorney, Agent, or Firm* — Lerner, David, Littenberg, Krumholz & Mentlik, LLP

(57) ABSTRACT

Apparatus and method for image coding may group code units corresponding to an image based on a same at least one parameter of each of the code units. Each group of code units which is grouped includes code units of which values of the same at least one parameter are the same. In addition, the code units of each group of code units which is grouped are entropy coded in parallel.

17 Claims, 13 Drawing Sheets

DIVISION LEVEL = 3
(H: HIGH PASS, L: LOW PASS)

CODE BLOCK
(EXAMPLE) 64 × 64

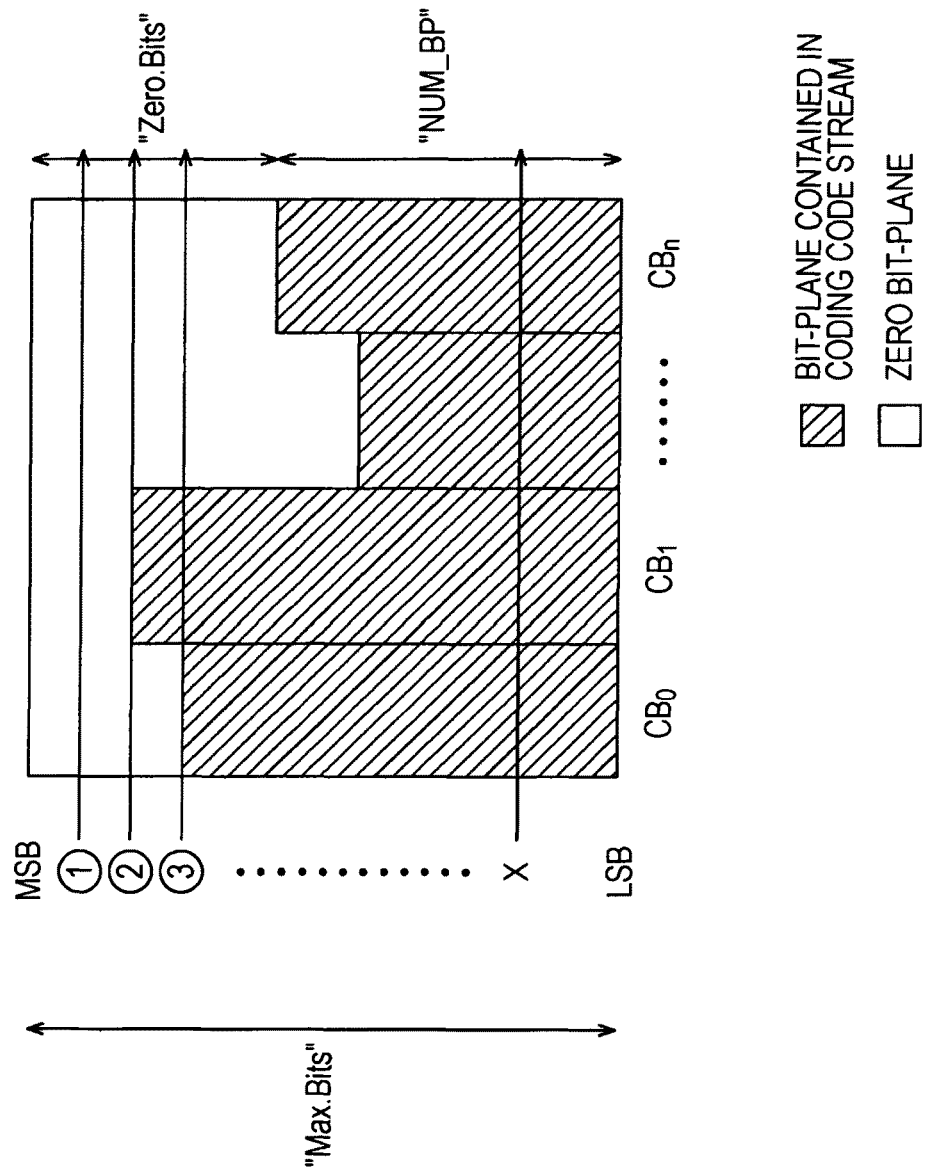

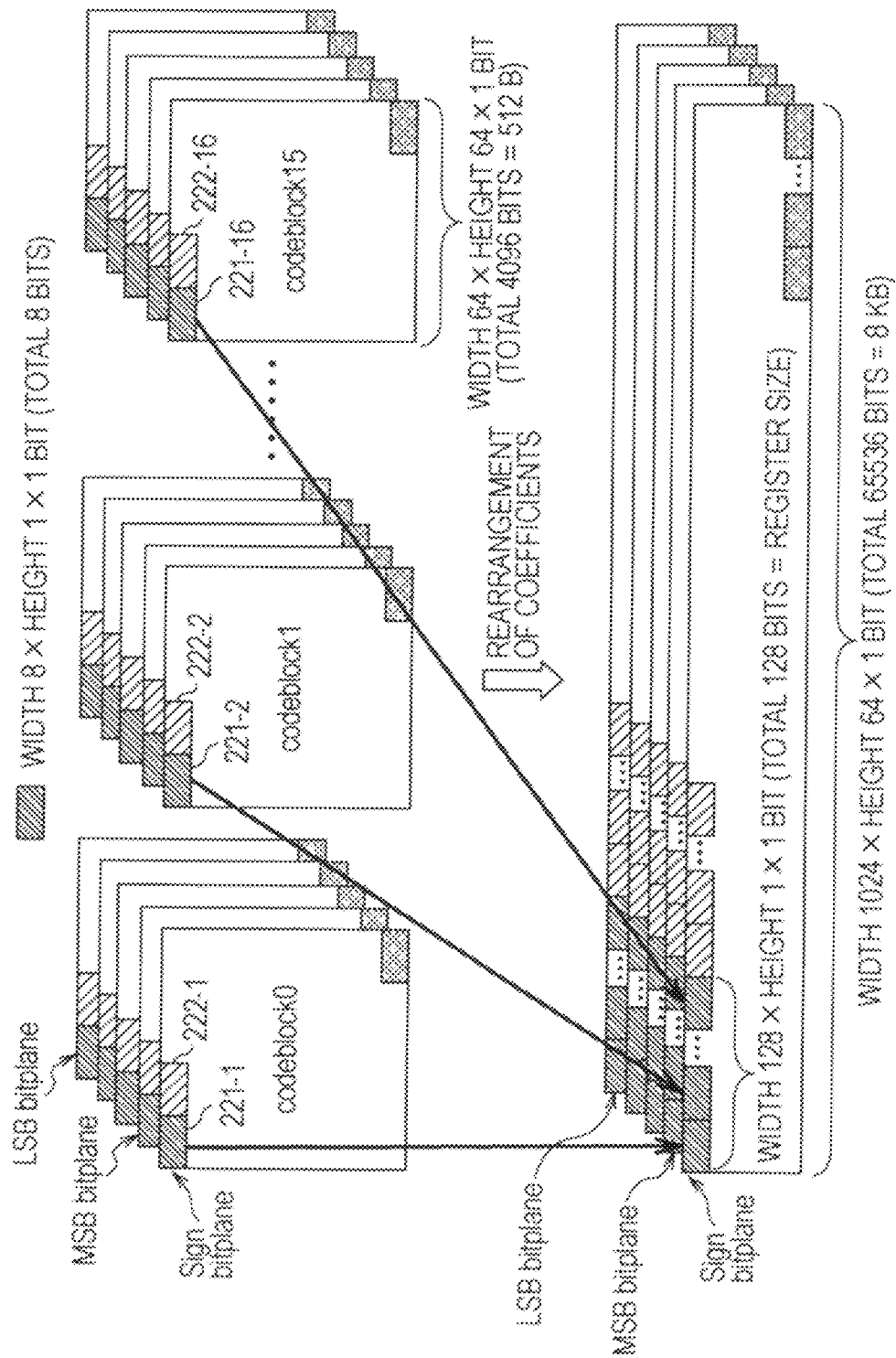

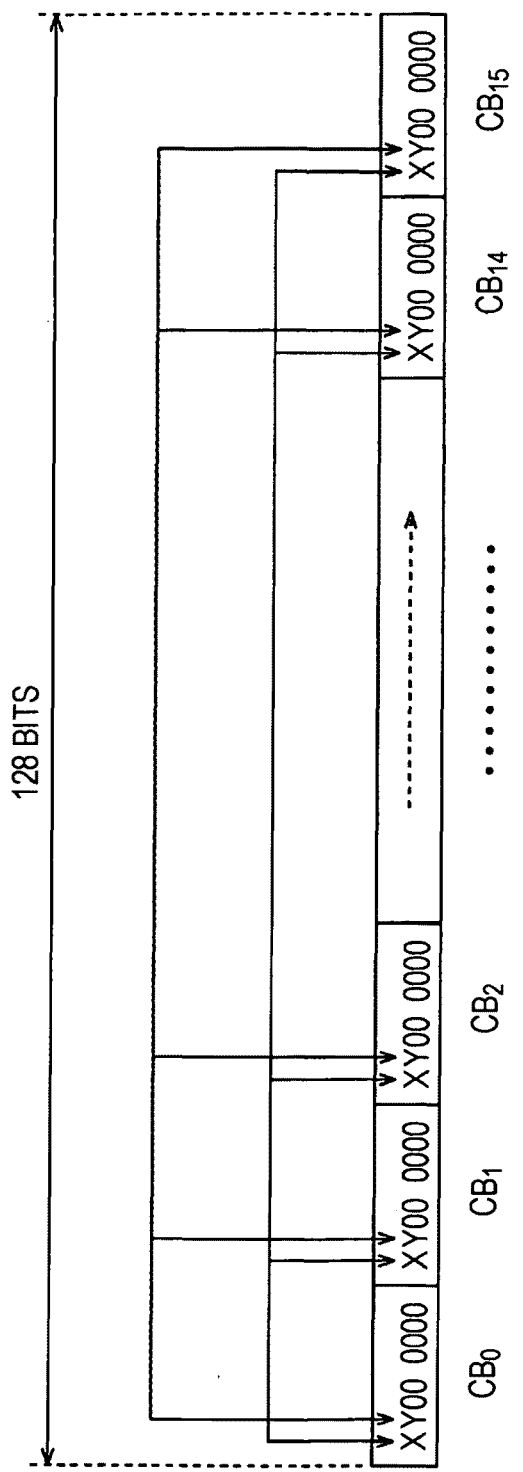

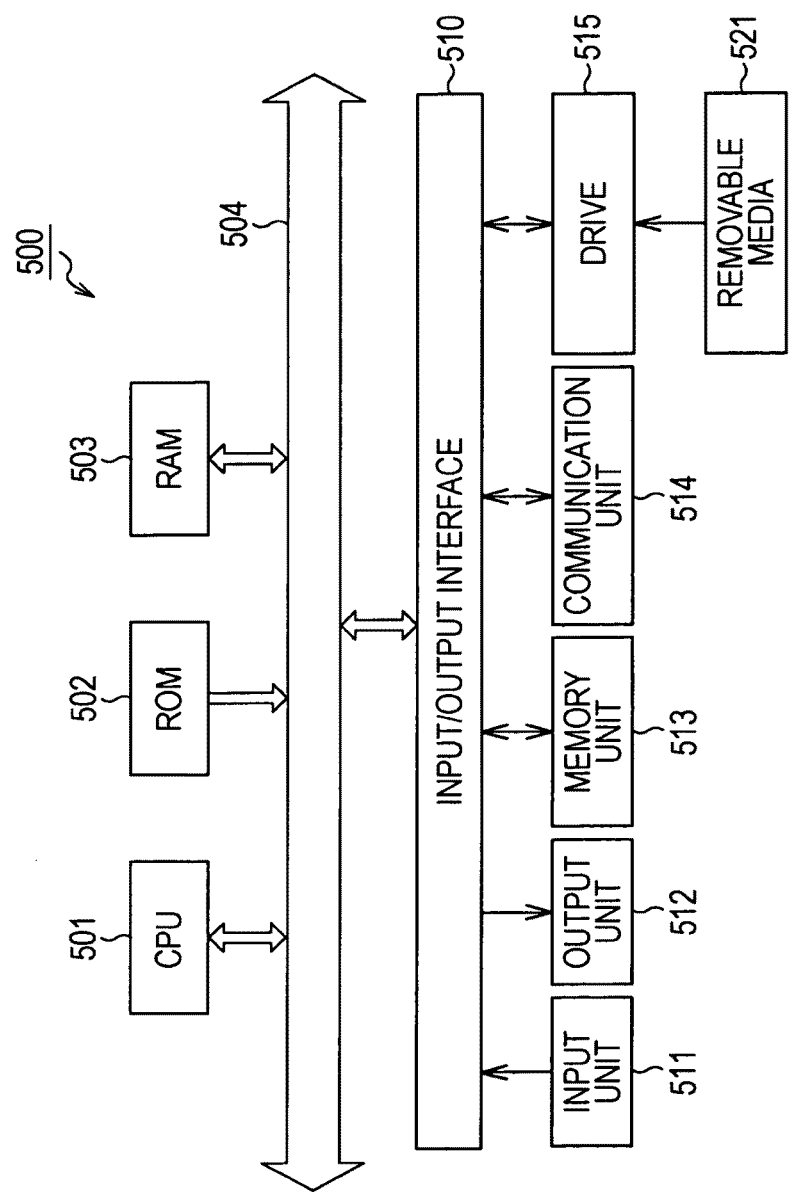

CODING APPARATUS AND METHOD

CROSS-REFERENCE TO RELATED APPLICATION

The present application claims priority from Japanese Patent Application No. JP 2009-242768 filed in the Japanese Patent Office on Oct. 21, 2009, the entire contents of which are hereby incorporated herein by reference.

BACKGROUND OF THE INVENTION

1. Field of the Invention

The present invention relates to a coding apparatus and a coding method, and more particularly, to a coding apparatus and a coding method capable of executing a coding operation at higher speed.

2. Description of the Related Art

JPEG (Joint Photographic Experts Group) 2000, which was standardized in 2000 by ISO/IEC (International Organization for Standardization/International Electrotechnical Commission), is expected to be a technique replacing JPEG in that JPEG 2000 has numerous functions such as a high compression ratio, lossy and lossless compression correspondence, scalability (resolution, image quality, and the like), and error-resistance.

In 2004, JPEG 2000 Part-1 was selected as a standard codec by Digital Cinema Initiative (DCI) of a digital cinema. Accordingly, image photographing, image editing, and image delivery of digital cinema can all be standardized by JPEG 2000.

Conserving an original form of a medical image, a satellite image, or the like is necessary. In recent years, there are numerous single-lens reflex digital cameras capable of storing RAW data or RGB data acquired from an image sensor of CCD (Charge Coupled Device) or CMOS (Complementary Metal Oxide Semiconductor) in a memory card in a non-compression state.

However, when a master image is not compressed, an advantage is obtained in that data loss of an image scarcely occurs. However, there is a disadvantage in that the size of data is considerably increased. Therefore, in future, the necessity for compression and decompression by lossless compression of JPEG 2000 in usages, where image quality is important, other than digital cinema, will increase.

Japanese Patent No. 3906630 discloses an image coding apparatus that includes both a fixed point type wavelet transformer and an integer type wavelet transformer and is capable of executing both reversible transformation and irreversible transformation. Therefore, in this image coding apparatus, a degree of freedom of selecting image quality or compression ratio is improved.

In JPEG 2000, however, a problem may arise in that calculation load is considerably increased in comparison to JPEG. In particular, it may take an enormous amount of time to execute lossless compression since all coefficient data have to be compressed without loss.

In the coding technique of JPEG 2000, a first large calculation load is an entropy coding unit called EBCOT (Embedded Block Coding with Optimized Truncation). The entropy coding unit uses a technique of executing arithmetic coding while modeling binary data developed in a bit plane in one pixel unit. Therefore, since there is "dependency" that the result of a high bit plane influences the result of a low bit plane upon sequentially executing the processes, it is difficult to execute a parallel operation in the code block. For this reason, in a case of coding or lossless compression of an image with a large resolution, whatever the method, processing the calculation load of JPEG 2000, in particular, realization of the high speed EBCOT, is key.

It is desirable to provide a technique capable of executing a coding operation at higher speed.

SUMMARY OF THE INVENTION

In accordance with an aspect of the invention, an image coding apparatus may include a group division unit to group code units corresponding to an image based on a same at least one parameter of each of the code units. Each group of code units grouped by the group division unit includes code units of which values of the same at least one parameter are the same. The coding apparatus may further include an entropy coding unit to entropy code in parallel the code units of each group of code units grouped by the group division unit.

In accordance with another aspect of the invention, a method of image coding may include grouping, by a processor, code units corresponding to an image based on a same at least one parameter of each of the code units. Each group of code units grouped by the processor includes code units of which values of the same at least one parameter are the same. The method may further include entropy coding in parallel the code units of each group of code units grouped by the processor.

BRIEF DESCRIPTION OF THE DRAWINGS

FIG. 7 is an explanatory diagram illustrating the coding pass.

FIG. 9 is an explanatory diagram illustrating generation of parallel calculation coefficient data.

FIG. 10 is an explanatory diagram illustrating the parallel calculation of the coefficient data.

FIG. 13 is a block diagram illustrating an exemplary configuration of a personal computer according to an embodiment of the invention.

DESCRIPTION OF THE PREFERRED EMBODIMENTS

Hereinafter, description of preferred embodiments (hereinafter, referred to as embodiments) of the invention will be described. The description is made in the following order.

1. First Embodiment (Image Coding Apparatus)
2. Second Embodiment (Personal Computer)

1. First Embodiment

Configuration of Image Coding Apparatus

Figure 1:
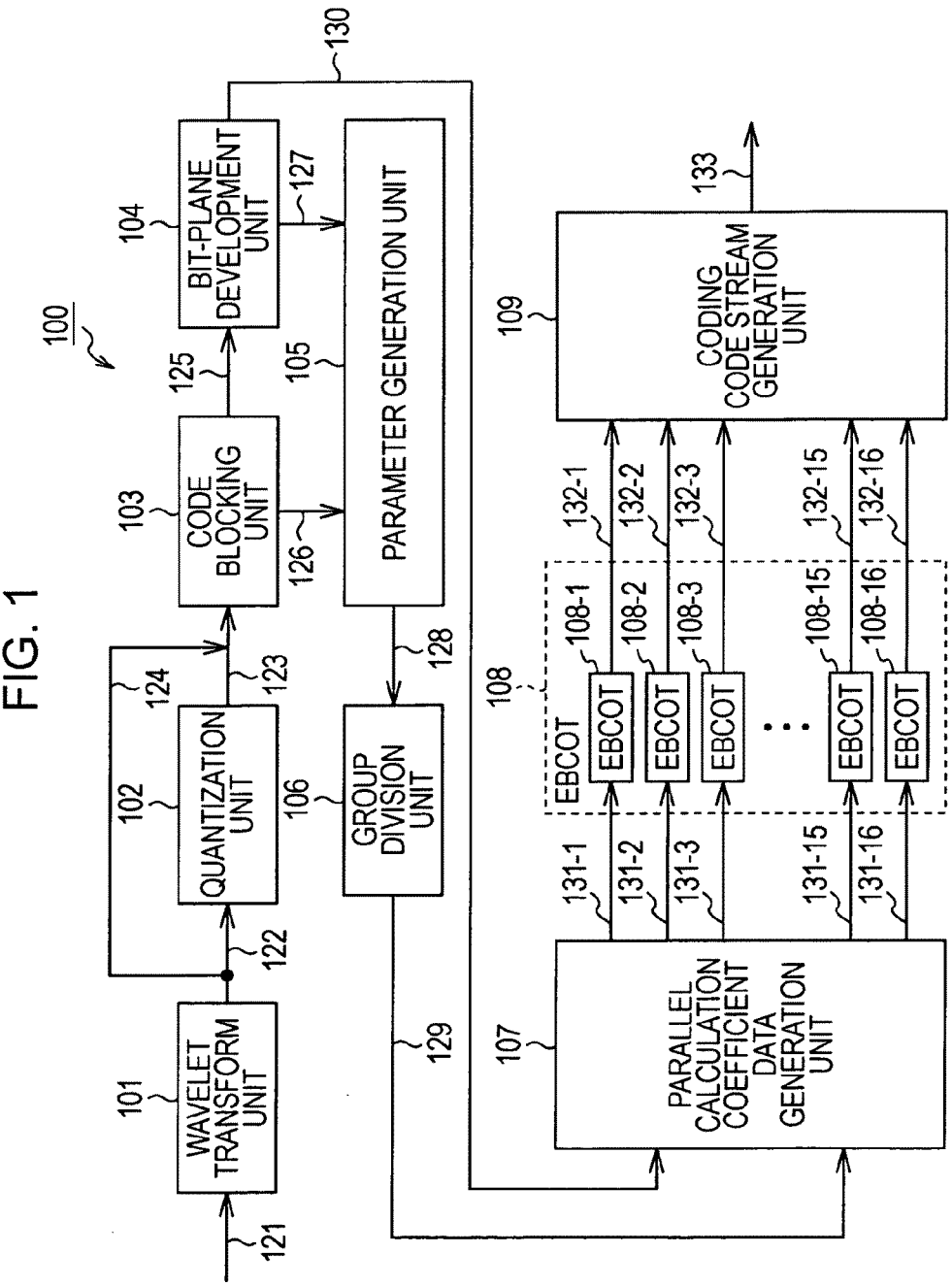
FIG. 1 is a block diagram illustrating an exemplary configuration of an image coding apparatus according to an embodiment of the invention.

FIG. 1 is a diagram illustrating the configuration of an image coding apparatus according to an embodiment of the invention. An image coding apparatus 100 shown in FIG. 1 is a coding apparatus that codes image data in a reversible or irreversible manner in the method of JPEG (Joint Photographic Experts Group) 2000.

The image coding apparatus 100 develops coefficients obtainable by executing wavelet transform on the image data to a bit plane in each code block and executes entropy coding on each bit plane.

The entropy coding called EBCOT (Embedded Block Coding with Optimized Truncation) is a technique capable of executing arithmetic coding while modeling binary data developed in the bit plane in one pixel unit.

In the past, since there is "dependency" that the result of a high bit plane influences the result of a low bit plane after the process is sequentially executed, it was considered to be difficult to execute a parallel operation in the code block with this entropy coding. For this reason, in a case of coding or lossless compression of an image with a large resolution, whatever the method, processing the calculation load of JPEG 2000, in particular, realization of the high speed EBCOT, is key.

The image coding apparatus 100 appropriately forms the code blocks into a group to generate coefficient data for parallel arithmetic and executes plural EBCOT in parallel. In this way, the image coding apparatus 100 is able to process EBCOT at high speed, that is, realize the reduction in the calculation load of JPEG 2000.

As shown in FIG. 1, the image coding apparatus 100 includes a wavelet transform unit 101, a quantization unit 102, a code blocking unit 103, a bit plane development unit 104, a parameter generation unit 105, a group division unit 106, a parallel calculation coefficient data generation unit 107, an EBCOT 108, and a coding code stream generation unit 109.

The wavelet transform unit 101 is generally realized by a filter bank including a low-pass filter and a high-pass filter. Since a digital filter typically has an impulse response (filter coefficient) with plural tap lengths, the wavelet transform unit 101 has a buffer that beforehand buffers an image input to the degree that a filtering process can be executed.

The wavelet transform unit 101 acquires input image data (indicated by an arrow 121) equal to or larger than the minimum amount of data necessary for a filtering process. The wavelet transform unit 101 executes the filtering process on the image data using a 5 by 3 wavelet transform filter, for example, to generate a wavelet coefficient. Moreover, the wavelet transform unit 101 executes the filtering process on the image data in vertical and horizontal directions of an image to separate the image data into a low-pass component and a high-pass component.

Figure 2:
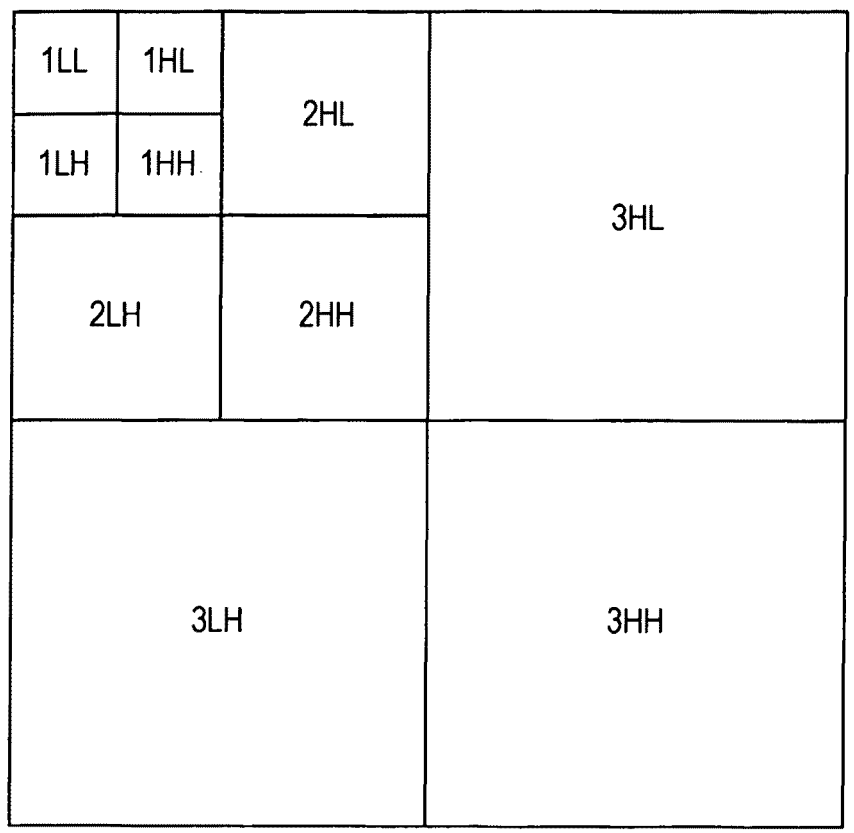
FIG. 2 is a diagram illustrating an exemplary configuration of sub-bands.

The wavelet transform unit 101 recursively repeats this filtering process on sub-bands separated as the low-pass component in both the vertical and horizontal directions a predetermined number of times, as shown in FIG. 2. The reason for repeating the filtering process is that most of the energy of the image is concentrated in the low-pass component.

FIG. 2 is a diagram illustrating an exemplary configuration of the sub-bands generated by the wavelet transform process at a division level number of 3. In this case, the wavelet transform unit 101 first filters the entire image to generate sub-bands 3LL (not shown), 3HL, 3LH, and 3HH. Subsequently, the wavelet transform unit 101 again filters the generated sub-band 3LL to generate sub-bands 2LL (not shown), 2HL, 2LH, and 2HH. Moreover, the wavelet transform unit 101 again filters the generated sub-band 2LL to generate sub-bands 1LL, 1HL, 1LH, and 1HH.

The division level number of wavelet transformation is determined arbitrarily.

Again referring to FIG. 1, the wavelet transform unit 101 supplies the coefficient data (wavelet coefficient) obtained by the filtering process to the quantization unit 102 for each sub-band (arrow 122).

The quantization unit 102 quantizes the supplied coefficient data (wavelet coefficient). The quantization unit 102 supplies the obtained coefficient data (quantized coefficient) to the code blocking unit 103 (arrow 123). In the standard of JPEG 2000, the quantization process is omitted in the case of the lossless compression. In this case, the coefficient data (wavelet coefficient) output from the wavelet transform unit 101 is supplied to the code blocking unit 103 (arrow 124).

The code blocking unit 103 divides the supplied coefficient data into code blocks with a predetermined size and a rectangular form, which are a processing unit of the entropy coding. According to the standard of JPEG 2000, the vertical and horizontal sizes of the code block are constant in any sub-band. However, there are many cases where the block codes with the same size may not be obtained in both ends and the upper and lower ends of an image (sub-band).

Figure 3:
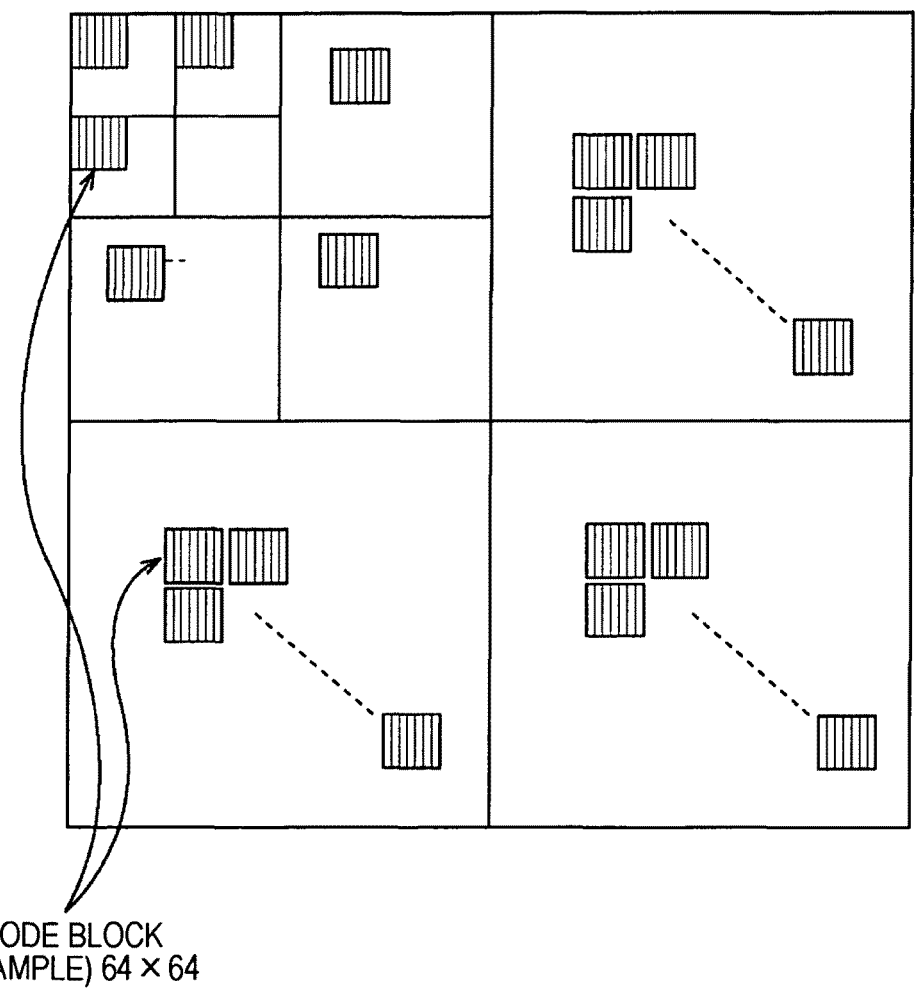
FIG. 3 is an explanatory diagram illustrating an example of a code block in each sub-band.

FIG. 3 is a diagram illustrating a positional relationship between the code blocks of each sub-band described with reference to FIG. 2. For example, a code block with a size of about 64 by 64 pixels is generated in each of the divided sub-bands after division. For example, on the assumption that the size of the sub-band 3HH having the smallest division level is 640 by 320 pixels, the total of the number of code blocks with 64 by 64 pixels is fifty. Each process unit on the rear stage executes a process on each block. Of course, the size (the number of pixels) of the code block is determined arbitrarily.

Again referring to FIG. 1, the code blocking unit 103 supplies the coefficient data to the bit plane development unit 104 in each code block (arrow 125). The code blocking unit 103 supplies information regarding each code block to the parameter generation unit 105 (arrow 126).

The bit plane development unit 104 develops the supplied coefficient data of each code block into a bit plane of each position of bits.

The bit plane is formed by dividing (slicing) a coefficient group (for example, the code block) organized by a predetermined number of wavelet coefficients in each one bit, that is, each position. That is, the bit plane is a set of bits (coefficient bits), which have the same position as each other, of plural data each having a bit depth of plural bits. The number of bit planes to be developed depends on the bit depth of each coefficient.

Figure 4:
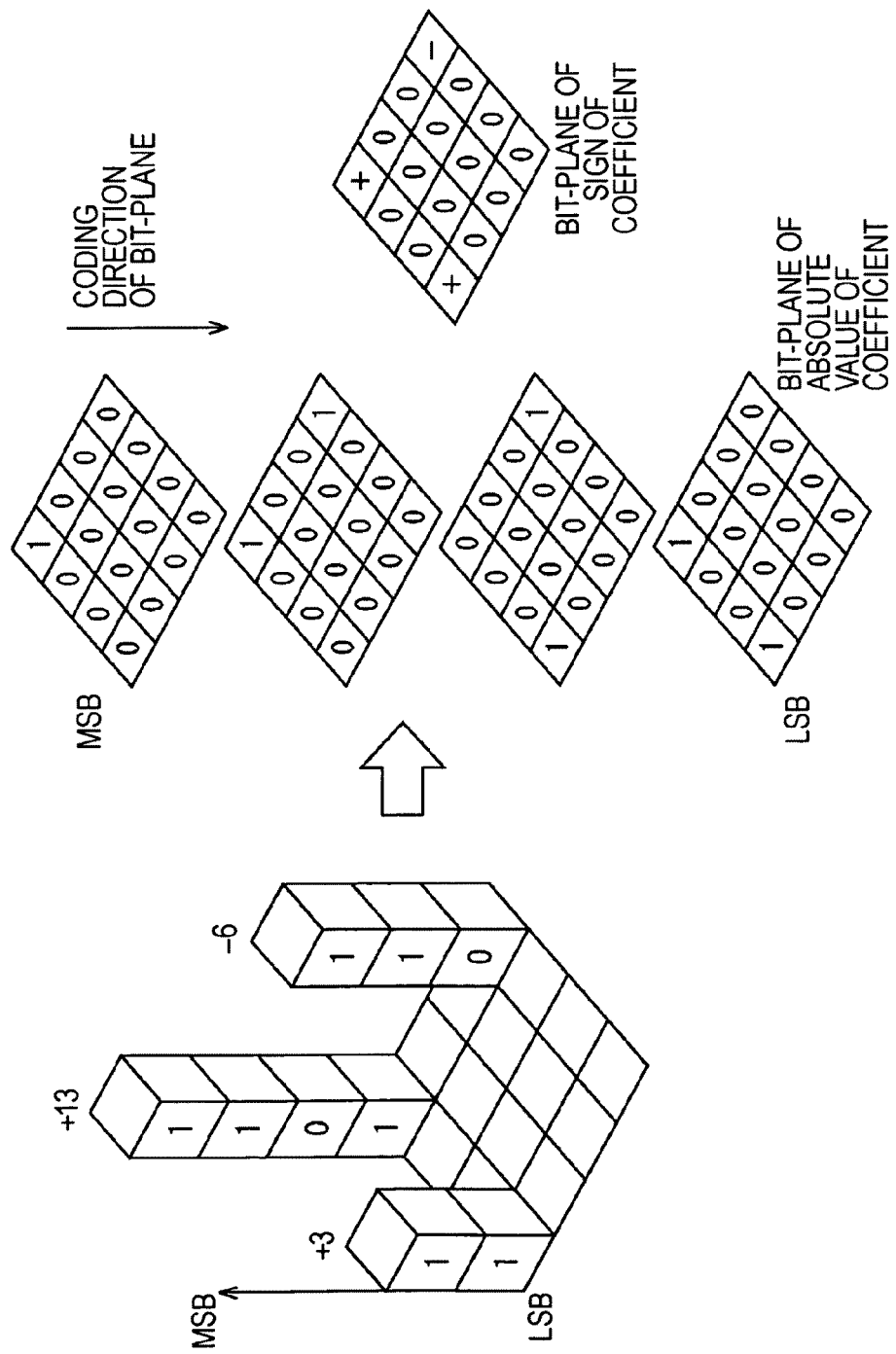
FIG. 4 is an explanatory diagram illustrating a bit plane.

FIG. 4 shows the specific example. The left figure of FIG. 4 shows four vertical coefficients and four horizontal coefficients, that is, sixteen coefficients in total. Of the sixteen coefficients, the number with the largest absolute value is 13 and can be expressed as 1101 in a binary-coded form. The bit plane development 104 develops the coefficient group into four bit planes (absolute value bit planes) representing an absolute value and one bit plane (sign bit plane) representing a sign. That is, the coefficient group shown in the left figure of FIG. 4 is developed into four absolute value bit planes and one sign bit plane, as shown in the right figure of FIG. 4. Here, elements of the absolute value bit planes all take 0 or 1 value. In addition, elements of the bit plane representing a sign take one of a value indicating that the value of a coefficient is positive, a value indicating that the value of a coefficient is 0, and a value indicating that the value of a coefficient is minus.

The number of coefficients in the coefficient group which is developed into the bit planes in this way is arbitrary. Hereinafter, a case will be described where the bit plane development unit 104 develops the coefficient into the bit planes in each code block in order to facilitate the process of each constituent element by uniting the processing units.

Again referring to FIG. 1, the bit plane development unit 104 supplies the developed bit planes to the parallel calculation coefficient data generation unit 107 in order from the most significant bit (MSB) of the coefficient to the least significant bit (LSB) of the coefficient. That is, the bit plane development unit 104 supplies the developed bit planes to the parallel calculation coefficient data generation unit 107 in order from the upper position of the bit depth to the lower position of the bit depth (arrow 130). In addition, the bit plane development unit 104 supplies information regarding the development of the bit planes to the parameter generation unit 105 (arrow 127).

The parameter generation unit 105 generates a parameter indicating the feature of each code block on the basis of the information supplied from the code blocking unit 103 and the bit plane development unit 104.

The parameter may contain any representative of the feature of the code block. For example, the parameter may contain the horizontal size (h_size) of the code block, the vertical size (v_size) of the code block, a sub-band type (LL, HL, LH, HH), and a calculated coding pass number (num_pass), which is described below. Of course, the parameter may contain one other than these.

A method of associating such a parameter with a certain code block is arbitrary. For example, according to identification information (code block number or the like) of the code block, the parameter may be associated with the code block.

Hereinafter, a coding pass will be described. As described below, the image coding apparatus 100 executes entropy coding called EBCOT (Embedded Coding with Optimized Truncation) determined particularly by the standard of JPEG 2000 (reference: ISO/IEC 15444-1, Information Technology-JPEG 2000, Part 1: Core Coding System).

EBCOT is a method of executing coding in a block with a predetermined size while measuring statistics of the coefficient in the block. A quantization coefficient is subjected to the entropy coding in code block unit. The code block is coded in a direction from the most significant bit (MSB) to the least significant bit (LSB) so as to be independent for each bit plane. The horizontal and vertical sizes of the code block are set by the power-of-two from 4 to 256. The generally used size is 32×32, 64×64, 128×32, or the like. Since the value of the quantization coefficient is expressed in an n-bit-signed binary number, bit 0 to bit n−1 represent respective bits from the LSB to the MSB. The remaining one bit expresses a sign. The coding of the code block is executed by the following three coding passes sequentially from the bit plane of the MSB.

(1) Significant Propagation Pass
(2) Magnitude Refinement Pass
(3) Cleanup Pass

Figure 5:
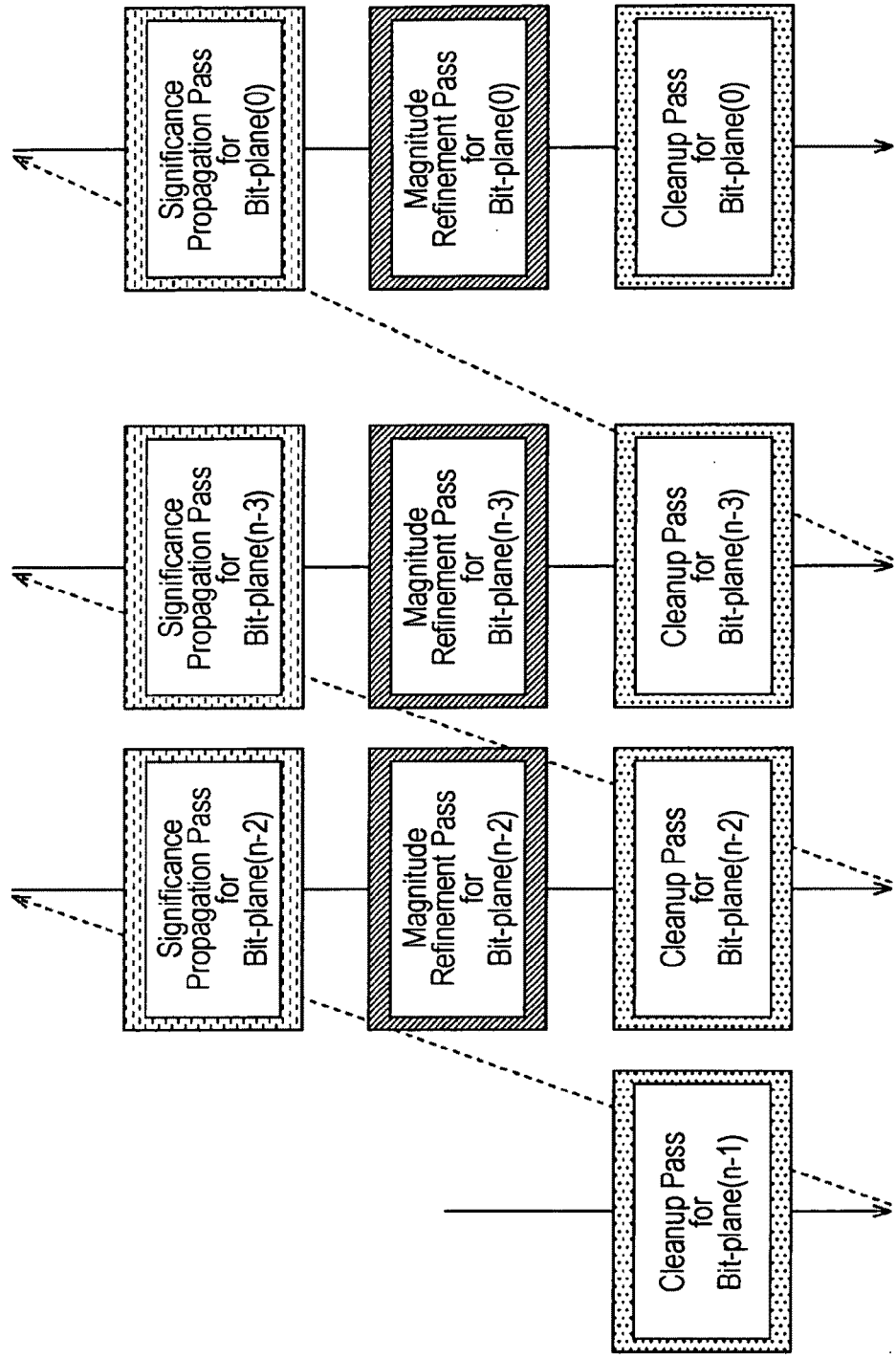
FIG. 5 is an explanatory diagram illustrating an example of a coding pass.

The use order of the three coding passes is shown in FIG. 5. The bit-plane (n−1) (MSB) is first coded by the cleanup pass. Subsequently, the coding of the respective bit planes is executed sequentially toward the LSB in the order of the significant propagation pass, the magnitude refinement pass, and the cleanup pass by using the three coding passes.

In effect, however, the number of bit planes from the MSB where 1 initially appears is written in a header. The bit plane (called a zero bit plane) of all consecutive 0's in the MSB is not coded. The trade-off between the coding amount and the image quality is made by coding the bit planes by using the three coding passes in this order and stopping the coding of an arbitrary bit plane up to an arbitrary coding pass (where rate control is executed).

Figure 6:
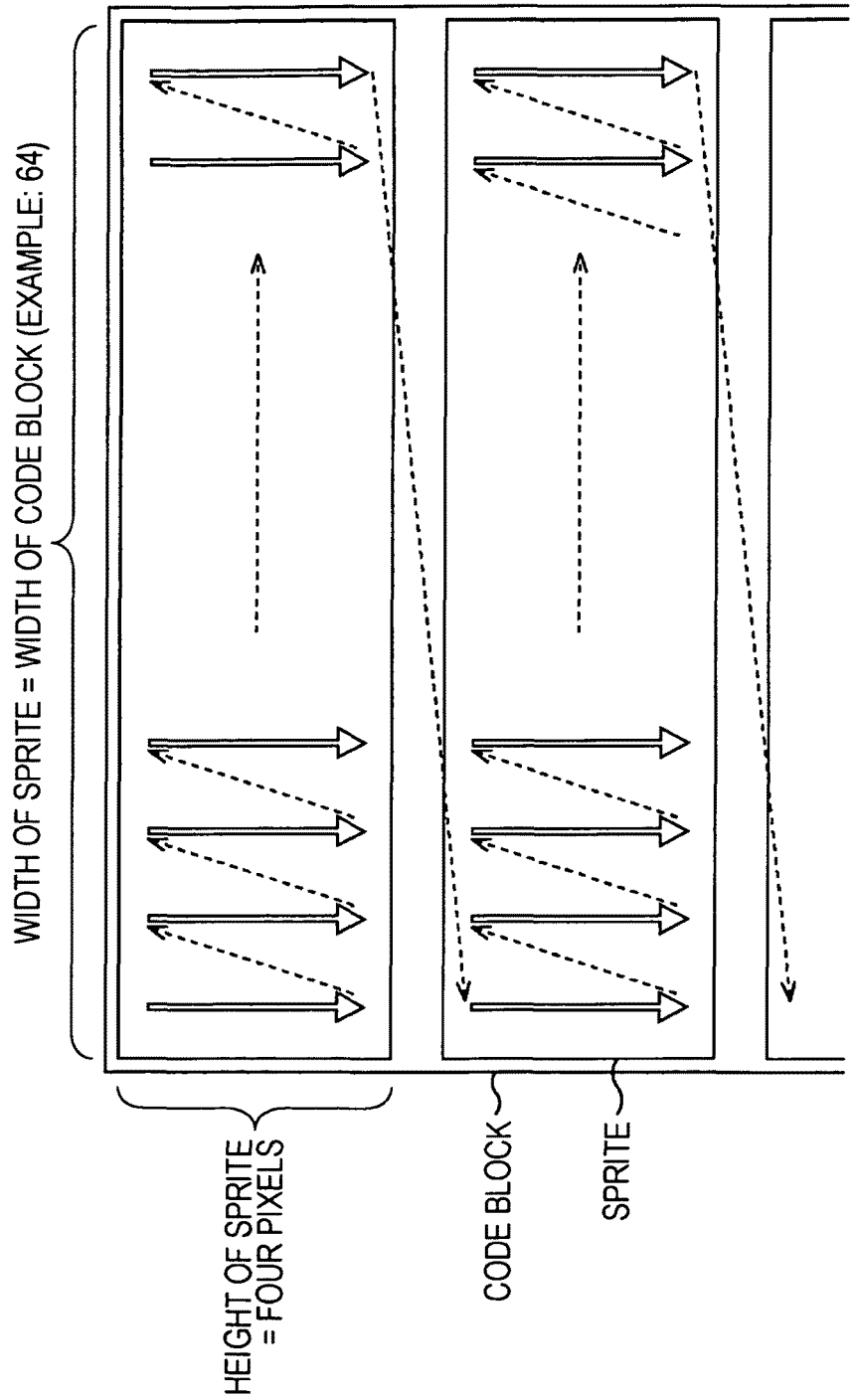
FIG. 6 is an explanatory diagram illustrating an example of scanning of coefficients.

Next, scanning of the coefficients will be described with reference to FIG. 6. The code block may be divided into sprites in every height corresponding to four coefficients. The width of the sprite is the same as the width of the code block. As for scanning order, all coefficients of one code block are sequentially traced, the code block is scanned in order from an upper sprite to a lower sprite, the sprite is scanned in order from a left row to a right row, and the row is scanned in order from an upper side to a lower side. All coefficients of the code block are processed in this scanning order in each coding pass.

Hereinafter, the three coding passes will be described. The following description is made using the standard of JPEG 2000 (reference: ISO/IEC 15444-1, Information Technology-JPEG 2000, Part 1: Core Coding System).

Significance Propagation Pass (SP Pass)

In the significance propagation pass of coding a certain bit plane, the value of a bit plane of non-significant coefficient in which at least one coefficient near eight coefficients is significant is arithmetically coded. When the value of the coded bit plane is 1, MQ coding is executed by determining whether the sign is + or −.

The specific terminology significance of JPEG 2000 will be described. The significance refers to a state which a coder has for each coefficient. An initial value of the significance is varied to 0 representing non-significance and is varied to 1 representing significance when 1 as the coefficient is coded, and then 1 constantly continues. Therefore, the significance also refers to a flag representing whether information regarding a significant number is coded in advance. When a coefficient becomes significant in a certain bit plane, the subsequent bit planes are in the significant state.

(2) Magnitude Refinement Pass (MR Pass)

In the magnitude refinement pass of coding the bit plane, the value of the bit plane of the significant coefficient which is not coded in the significance propagation pass of coding the bit plane is subjected to the MQ coding.

(3) Cleanup Pass (CU Pass)

In the cleanup pass of coding the bit plane, the value of the bit plane of the non-significant coefficient which is not coded in the significance propagation pass of coding the bit plane is subjected to the MQ coding. When the value of the coded bit plane is 1, the MQ coding is continuously executed by determining whether the sign is + or −.

In the MQ coding in the above-mentioned three coding passes, ZC (Zero Coding), RLC (Run-Length Coding), SC (Sign Coding), and MR (Magnitude Refinement) can be separately used depending on a case. Here, an arithmetic code called the MQ coding is used. The MQ coding is a learning binary arithmetic code defined in JBIG2 (reference: ISO/IEC FDIS 14492, "Lossy/Lossless Coding of Bi-level Images", March 2000).

In FIG. 7, the horizontal axis represents a code block ($CB_0$ or $CB_n$: n+1 code blocks) and the vertical axis represents a bit plane. A bit plane which is continuous from the bit plane of the MSB and of which the coefficients are all 0's is called a zero bit plane. A bit plane other than the zero bit plane is called an effective bit plane. Moreover, Zero.Bits in FIG. 7 is defined as the number of zero bit planes and the maximum bit depth (LSB to MSB) defined before the coding is defined as Max.Bits.

Therefore, the coding pass number (num_pass) representing the number of coding passes used for one code block is calculated by Expression (1) as follows.

$$\text{num\_pass} = (\text{Max.Bits} - \text{Zero.Bits}) \times 3 - 2 \quad (1)$$

Again referring to FIG. 1, the parameter generation unit 105 supplies a parameter generated in the above-described way to the group division unit 106 (arrow 128).

The group division unit 106 divides the code block in groups on the basis of the parameter supplied from the parameter generation unit 105. The group division unit 106 acquires the parameter for a code block corresponding to one image.

Figure 8A:
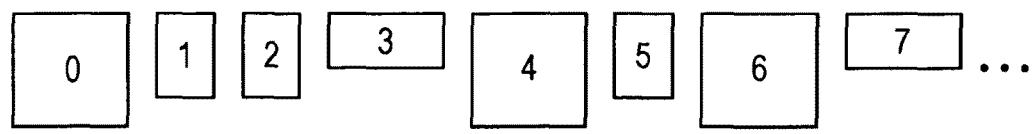
FIGS. 8A to 8C are explanatory diagrams illustrating grouping of code blocks.

As in an example shown in FIG. 8A, all the sizes (horizontal and vertical sizes) of the code blocks in the image are not the same. As described above, the code blocks are basically divided so as to have the same size (basic size). However, the basic size may not be ensured in both ends or the upper and lower ends of the image (sub-band). The sizes of the code blocks in these ends are smaller than the basic size.

As described above, since the code blocks are divided for the coefficient data, not all of the sub-bands belonging to each code block in the image are the same. Moreover, since the number (effective bit plane number) of zero bit planes of each code block are independent from each other, the coding pass numbers may also be different from each other in each code block.

Figure 8B:
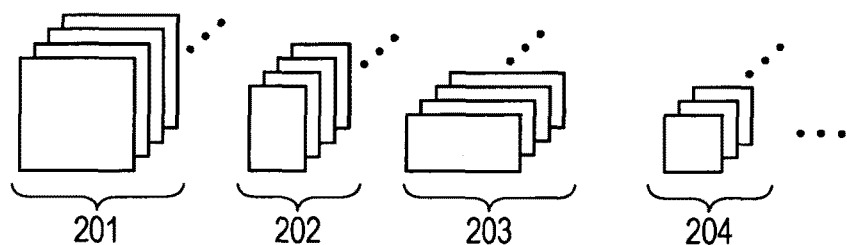

The group division unit 106 compares the values of the parameters of each code block in the image to group the code blocks in which all values are the same, as shown in FIG. 8B.

In FIG. 8B, groups 201 to 204 are code block groups each classified in accordance with the parameters. In other words, the values of all parameters of all code blocks are the same as each other in each group.

Figure 8C:
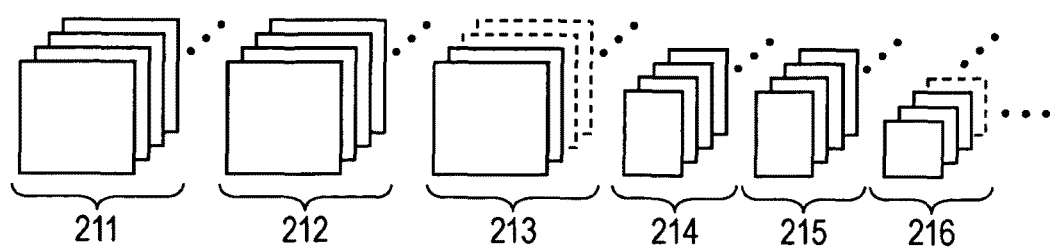

The group division unit 106 appropriately divides the groups divided in accordance with the parameters so that each group is organized by the maximum sixteen code blocks. Groups 211 to 216 shown in the example of FIG. 8C are some of the groups formed by further dividing each group shown in FIG. 8B so that each group is organized by the maximum sixteen code blocks. For example, groups 211 to 213 in FIG. 8C are formed by further dividing group 201 in FIG. 8B. Groups 214 and 215 in FIG. 8C are formed by further dividing group 202 in FIG. 8B. Group 216 in FIG. 8C corresponds to group 204 in FIG. 8B. However, since the number of code blocks belonging to group 204 is sixteen or less, the number of code blocks of group 216 is the same as the number of code blocks of group 204.

Again referring to FIG. 1, the group division unit 106 supplies information regarding the group division and information, such as a parameter, regarding each code block to the parallel calculation coefficient data generation unit 107 (arrow 129).

The parallel calculation coefficient data generation unit 107 rearranges the coefficient data of each code block in each group in parallel and generates parallel calculation coefficient data so that the code blocks in the group can be calculated (entropy coding) in parallel.

The parallel calculation coefficient data generation unit 107 stores (maintains) coefficient data in a memory (not shown), when the parallel calculation coefficient data generation unit 107 acquires the coefficient data from the bit plane development unit 104. When the parallel calculation coefficient data generation unit 107 acquires the coefficient data corresponding to one image, the parallel calculation coefficient data generation unit 107 reads the coefficient data sequentially from the upper side to the lower side and from the left side to the right side of the coefficient data at the same position as that of each code block belonging to a processing target block in accordance with the group division of the group division unit 106, and arranges the coefficient data in the registers of the memory. The parallel calculation coefficient data generation unit 107 reads the coefficient data for each bit plane.

FIG. 9 is a diagram illustrating the generation of the parallel calculation coefficient data from the group of the code block with a 64 by 64 size. In FIG. 9, codeblock 0 to codeblock 15 of an upper stage show sixteen code blocks belonging to a processing target group. A lower stage shows the coefficient data arranged (rearranged) in the registers.

As shown in FIG. 9, the coefficient data at the same position as that of each code block are read and arranged in the registers by eight bits (width 8×height 1×1 bit). For example, in Sign bitplane, coefficient data 221-1 of eight bits is read from codeblock 0 and coefficient data 221-2 of eight bits is read from codeblock 1. Coefficient data are read from codeblock 3 to codeblock 14 in the same manner. Coefficient data 221-16 of eight bits is read from codeblock 15. Coefficient data 221-1 to coefficient data 221-16 are arranged in parallel in the registers. That is, the parallel calculation coefficient data of 128 bits (width 128×height 1×1 bit) is formed (the size of a register is 128 bits or more).

As described below, when the parallel calculation coefficient data of the register are paralleled and coded for each coefficient data of eight bits, subsequent coefficient data 222-1 of eight bits is read from codeblock 0 and subsequent coefficient data 222-2 of eight bits is read from codeblock 1. Subsequent coefficient data of eight bits are read from codeblock 3 to codeblock 14 in the same manner. Subsequent coefficient data 222-16 of eight bits is read from codeblock 15. Coefficient data 222-1 to coefficient data 222-16 are arranged in parallel in registers, as in coefficient data 221-1 to coefficient data 221-16. That is, the parallel calculation coefficient data of 128 bits (width 128×height 1×1 bit) is formed.

The parallel calculation coefficient data are paralleled and coded in each coefficient data of eight bits. This process is executed on all of the coefficient data in the code blocks.

At this time, in the code blocks in the same group, the values of parameters (horizontal size, vertical size, the coding pass number (effective bit plane number), and a sub-band type) are all the same as each other. That is, the respective sample numbers (64×64=4,096) of codeblock 0 to codeblock 15 or the number of bit planes of the MSB to the LSB are all the same as each other.

That is, the code blocks in the same group have a data structure capable of executing coding in the same method. In other words, each code block has a data structure most easily paralleled.

Since the code blocks have the same data structure, the coefficient data of each code block can be easily rearranged so as to be paralleled without shortage or surplus by the above-described rearrangement.

When the number of code blocks in the group is less than sixteen, the parallel calculation coefficient data generation unit 107 solves the shortage of the number of code blocks by supplementing dummy data (for example, zero value) (the number of code blocks is sixteen in a pseudo manner).

Again referring to FIG. 1, the parallel calculation coefficient data generation unit 107 supplies the parallel calculation coefficient data to the EBCOT 108. The EBCOT 108 executes arithmetic coding on the bit planes of the coefficients by bit-modeling of the coefficient data in the order determined in the standard of JPEG 2000.

The EBCOT 108 includes an EBCOT 108-1 to an EBCOT 108-16. The EBCOT 108-1 to the EBCOT 108-16 each executes arithmetic coding on the bit planes of the coefficients by bit modeling of the coefficient data in the order determined in the standard of JPEG 2000. That is, the EBCOT 108 executes entropy coding called EBCOT determined in the standard of JPEG 2000 in up to 16 parallel executions.

The parallel calculation coefficient data generation unit 107 supplies the parallel calculation coefficient data of the register by eight bits, that is, the coefficient data read from each code block is supplied to the EBCOT 108-1 to the EBCOT 108-16 (arrows 131-1 to 131-16).

The EBCOT 108-1 to the EBCOT 108-16 codes the supplied coefficient data in parallel to generate the coding data.

FIG. 10 is a diagram illustrating 16 parallel operations at one time of the coefficients in the 128-bit register of FIG. 9. In the drawing, the binary values sectioned with eight pixels are processed from the left end to the right end while shifting the values by one bit.

In an example according to a related art,
order 1: X→Y→of $CB_0$ . . . 0
order 2: X→Y→of $CB_1$ . . . 0
order 3: X→Y→of $CB_2$ . . . 0
. . .
order 15: X→Y→of $CB_{14}$ . . . 0
order 16: X→Y→of $CB_{15}$ . . . 0.

The coding is executed in these orders. Therefore, time corresponding to sixteen code blocks×8 bits is necessary, as shown in order 1 to order 16.

In the embodiment of the invention, the coefficients of sixteen code blocks at the same position are coded at one time (in parallel).

That is, in the embodiment of the invention,
order 1: X of $CB_0$, $CB_1$, $CB_2$, . . . $CB_{14}$, $CB_{15}$
order 2: Y of $CB_0$, $CB_1$, $CB_2$, . . . $CB_{14}$, $CB_{15}$
order 3: 0 of $CB_0$, $CB_1$, $CB_2$, . . . $CB_{14}$, $CB_{15}$
order 4: 0 of $CB_0$, $CB_1$, $CB_2$, . . . $CB_{14}$, $CB_{15}$
order 5: 0 of $CB_0$, $CB_1$, $CB_2$, . . . $CB_{14}$, $CB_{15}$
order 6: 0 of $CB_0$, $CB_1$, $CB_2$, . . . $CB_{14}$, $CB_{15}$
order 7: 0 of $CB_0$, $CB_1$, $CB_2$, . . . $CB_{14}$, $CB_{15}$
order 8: 0 of $CB_0$, $CB_1$, $CB_2$, . . . $CB_{14}$, $CB_{15}$.

The coding is executed in these orders. Therefore, the EBCOT 108 can execute the coding for time corresponding to eight bits of order 1 to order 8. That is, the EBCOT 108 can execute the coding more rapidly in the example according to the related art.

Again referring to FIG. 1, the EBCOT 108-1 to the EBCOT 108-16 supply the generated coding data to the coding code stream generation unit 109 (arrows 132-1 to 132-16).

The coding code stream generation unit 109 rearranges the coding data supplied from the EBCOT 108-1 to the EBCOT 108-16 in the same arrangement order as that of the coding data according to the related art, and then outputs the coding data as one code stream (arrow 133).

According to the related art, as described above, the code blocks of the coefficient data developed into the bit planes are sequentially coded. The coding code stream generation unit 109 rearranges the orders of the coding data so that the order becomes the same arrangement order as that of the coefficient data generated according to the related art.

The coding data are rearranged by temporarily storing each coding data generated by the EBCOT 108-1 to the EBCOT 108-16 in the memory and reading the coding data in the order of the coding order according to the related art.

When the dummy data is inserted by the parallel calculation coefficient data generation unit 107 and then the coding is executed, the coding code stream generation unit 109 deletes the coding data corresponding to the dummy data (which is not included in the code stream).

Flow of Process

Figure 11:
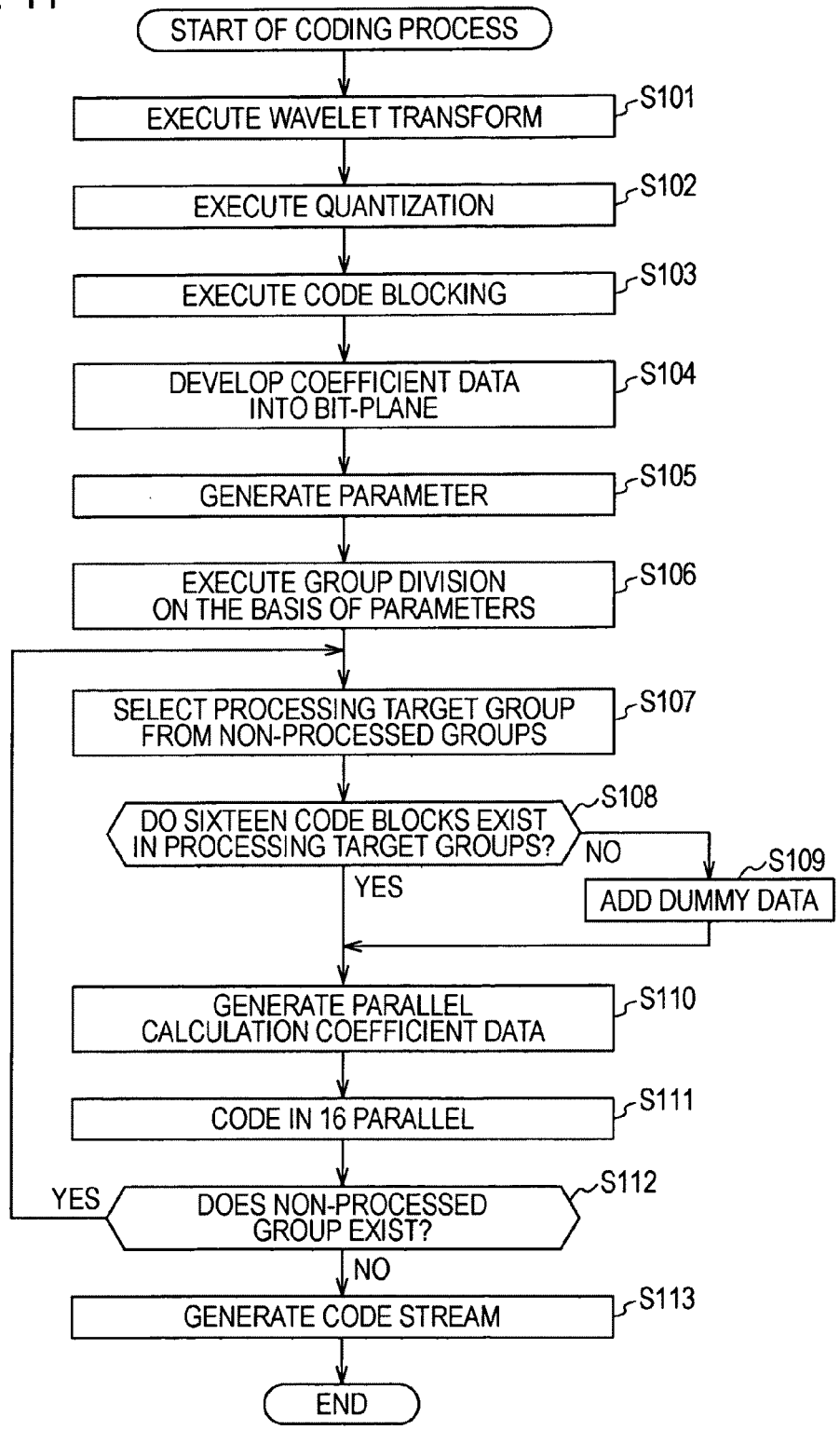
FIG. 11 is a flowchart illustrating an exemplary routine of a coding operation.

An exemplary flow of the above-described coding process will be described with reference to the flowchart of FIG. 11.

When the coding process starts, the wavelet transform unit 101 executes wavelet transform on image data corresponding to one image in step S101. In step S102, the quantization unit 102 quantizes the coefficient data generated in step S101. In a case of reversible coding, the process of step S102 is omitted.

In step S103, the code blocking unit 103 executes code blocking on the coefficient data. In step S104, the bit plane development unit 104 develops the coefficient data into the bit planes.

In step S105, the parameter generation unit 105 generates the parameters (for example, h_size, v_size, num_pass, and sub_type) of each code block. In step S106, the group division unit 106 executes group division on each code block on the basis of the parameters. As described above, the group division unit 106 forms the maximum sixteen code blocks, in which the values of the parameters are all the same, into one group.

In step S107, the parallel calculation coefficient data generation unit 107 selects a processing target group from non-processed groups in each group generated in step S106.

In step S108, the parallel calculation coefficient data generation unit 107 determines whether sixteen code blocks exist in the processing target group. When it is determined that sixteen code blocks exist, the process proceeds to step S110.

Alternatively, when it is determined that sixteen code blocks do not exist in the processing target group in step S108, the process proceeds to step S109. In step S109, the parallel calculation coefficient data generation unit 107 adds dummy data of the code blocks by the number of the shortage from the sixteen code blocks. For example, the parallel calculation coefficient data generation unit 107 adds a code block of which coefficient values are all 0 as dummy data to the code blocks of the processing target group.

When the number of code blocks of the processing target group including the dummy data is sixteen in the process of step S109, the process proceeds to step S110.

In step S110, the parallel calculation coefficient data generation unit 107 generates the parallel calculation coefficient data using the coefficient data of the code blocks of the processing target group. In step S111, the EBCOT 108 executes the entropy coding in 16 parallel executions using the parallel calculation coefficient data.

In step S112, the parallel calculation coefficient data generation unit 107 determines whether the non-process group exists. When it is determined that the non-process group exists, the process returns to step S107 and the subsequent process is repeated. Alternatively, when it is determined that all of the groups in the image are processed in step S112, the process proceeds to step S113.

In step S113, the coding code stream generation unit 109 rearranges the coding data generated by the EBCOT 108, and then generates and outputs a code stream. When the process of step S113 ends, the coding process ends.

The coding process is executed in each image.

As described above, the image coding apparatus 100 generates the parameters representing the features of the code blocks, forms the code blocks of which the values of the parameters are all the same into each group with the maximum sixteen code blocks, and executes the entropy coding on the code blocks of each group in parallel.

In this way, the image coding apparatus 100 can execute the coding at higher speed, since the image coding apparatus 100 can execute the process of the EBCOTs for the plural code blocks in parallel.

As described above, since the EBCOT of which the calculation load is large can be paralleled, the image coding apparatus 100 can considerably reduce the calculation load of the coding process.

Applied Examples

The length of the register has hitherto been described as 128 bits, but the length of the register may be arbitrary. The parallel number of EBCOTs has hitherto been described as sixteen, but the invention is not limited thereto. The parallel number of EBCOTs may be any number. Of course, the coding process can be executed at higher speed with an increase in the parallel number of EBCOTs.

In FIG. 1, the EBCOT 108 includes the EBCOT 108-1 to the EBCOT 108-16. However, this configuration is an exemplary configuration when the parallel number of executable processes is sixteen. That is, the configuration of the EBCOT 108 is determined in accordance with the parallel number. For example, when the parallel number is N, the EBCOT 108 includes the EBCOT 108-1 to the EBCOT 108-N.

However, the parallel number of EBCOTs depends on the length of the register and the data amount of processing unit. For example, as described above, when the length of the register is 128 bits and the processing unit is 8 bits, the parallel number of EBCOTs is 128/8=16. That is, the parallel number N of EBCOTs can be expressed as a value (N=L/D) obtained by dividing L bit of the data register length of a computer or hardware by the bit length D bit of the data processing unit (where N, L, and D are natural numbers).

Figure 12:
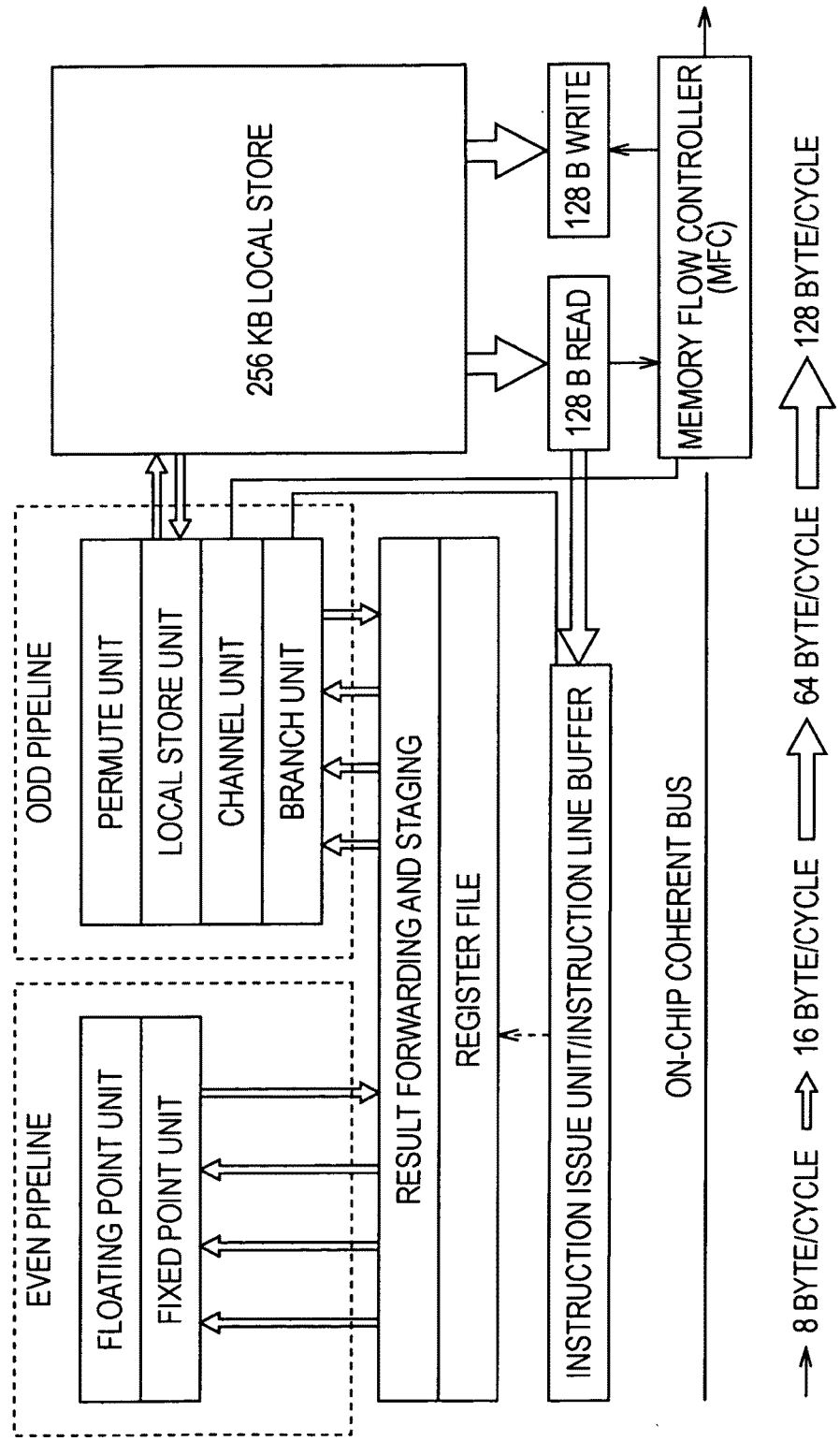
FIG. 12 is a diagram illustrating an example of hardware according to an embodiment of the invention.

In general, the length of the data register of a computer or hardware is determined in the initial design stage. That is, the maximum parallel number of EBCOTs mainly depends on hardware specifications. FIG. 12 is a diagram illustrating an exemplary hardware configuration to which the image coding apparatus 100 in FIG. 1 is applied.

In the configuration in FIG. 12, eight sub-processors SPE (Synergistic Processing Elements) exist in a processor called CBE (Cell Broadband Engine). As shown in FIG. 12, reading or writing (Read/Write) from or to a 256-KB local store (cache memory) can be executed in 128-bit unit in the SPE. That is, in this configuration, the length of the register corresponds to 128 bits.

In the reading or writing (Read/Write) from or to the 128-bit register, 16 bits×8 parallels and 32 bits×4 parallels as well as 8 bits×16 parallels are possible. Therefore, in the SPE, up to 16 parallel executions is possible. However, 4 bits×32 parallels and 2 bits×64 parallels are possible in another computer system or a hardware system. In this case, the coding process can be realized at higher speed.

2. Second Embodiment

Personal Computer

The above-described series of processes may be executed by hardware or software. In this case, for example, a personal computer shown in FIG. 13 may have the configuration.

A CPU (Central Processing Unit) 501 of a personal computer 500 in FIG. 13 executes a variety of processes in accordance with a program stored in a ROM (Read-Only Memory) 502 or a program loaded in a RAM (Random Access Memory) 503 from a memory unit 513. In the RAM 503, the CPU 501 executes a variety of processes and necessary data are appropriately stored.

The CPU 501, the ROM 502, and the RAM 503 are connected to each other via a bus 504. An input/output interface 510 is connected to the bus 504.

An input unit 511 formed by a keyboard, a mouse, or the like, a display formed by a CRT (Cathode Ray Tube), an LCD (Liquid Crystal Display), or the like, an output unit 512 formed by a speaker or the like, a memory unit 513 formed by a hard disk drive, and a communication unit 514 formed by a modem or the like are connected to the input/output interface 510. The communication unit 514 executes a communication process via a network including the Internet.

A drive 515 is connected to the input/output interface 510, as necessary, and a removable media 521 such as a magnetic disk, an optical disk, a magneto-optical disk, or a semiconductor memory is appropriately mounted so that a computer program read from the removable media 521 is installed in the memory unit 513, as necessary.

When the above-described series of processes is executed by software, a program of the software is installed from a network or a recordable medium.

As shown in FIG. 13, for example, the recordable medium includes the remote media 521 such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory in which a program distributed to deliver a program to a user is recorded, which is separate from the apparatus main body, and the ROM 502 storing a program delivered to a user in a state where the program is embedded in advance in the apparatus main body, as well as the hard disk drive included in the memory unit 513 and any non-transitory recording medium.

The program executed by the computer may be a program processed in time-series in the order described in the specification or a program processed in parallel or at timing necessary when the program is called.

In the specification, steps describing the program stored in the record medium include not only a step which is executed in time-series in recorded order but also a step which is not necessarily executed in time-series but is executed in parallel or separately.

In the specification, a system represents the entire apparatus including the plurality of devices (apparatuses).

The configuration described as one apparatus (or the process unit) may be divided and may be configured as a plurality of apparatuses (or process units). On the contrary, the configuration described as the plurality of apparatuses (or process units) may be configured as one apparatus (or a process unit) as a whole. Another configuration may be added to the configuration of each apparatus (or each process unit). Moreover, when the configuration or the operation of the entire system is substantially the same, a part of the configuration of a certain apparatus (or a process unit) may be included in the configuration of another apparatus (or another process unit).

The embodiment of the invention is applicable to a digital cinema editing apparatus, an archive system, an image transmission apparatus of a broadcast station, an image database, a medical image record system, a network server, a non-linear editing apparatus, a game console, a television receiver system, an HDD recorder, an authoring tool of a PC, a software module of the authoring tool, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An image coding apparatus comprising:
 a processor
 to group code units corresponding to an image by comparing values of at least one same parameter of each of the code units and forming each group of code units with any number of code units not exceeding a predetermined maximum number, wherein each group of code units grouped includes code units of which all values of the at least one same parameter are the same;

to add dummy data to each group of the code units determined to include less than the predetermined maximum number of code units, such that a number of the code units belonging to the each group of code units is the predetermined maximum number; and to entropy code in parallel the code units of the each group of code units grouped.

2. The apparatus of claim 1, wherein the code units are grouped based on a plurality of same parameters of each of the code units, and wherein the values of the respective same parameters of the code units in the each group of code units grouped are the same.

3. The apparatus of claim 1, wherein the code units include code blocks with which the at least one same parameter is associated.

4. The apparatus of claim 3, wherein the at least one same parameter represents at least one of horizontal size, vertical size, sub-band type and calculated coding pass number.

5. The apparatus of claim 1, wherein the processor arranges the groups of code units such that the code units of the each group of code units grouped can be entropy coded in parallel.

6. The apparatus of claim 1, wherein the processor is
to arrange coding data from entropy coding in parallel the coding units of the each group of code units grouped, into a predetermined arrangement, by deleting the coding data corresponding to the dummy data.

7. The apparatus of claim 1, wherein the processor is
to transform image data representative of the image into coefficient data in each sub-band; and
to divide a region of the sub-band of the coefficient data into the code units.

8. The apparatus of claim 7, wherein the coefficient data of the code units is coded at the same position in the group in parallel.

9. A method of image coding comprising:
grouping, by a processor, code units corresponding to an image by comparing values of at least one same parameter of each of the code units and forming each group of code units with any number of code units not exceeding a predetermined maximum number, wherein each group of code units grouped by the processor includes code units of which all values of the at least one same parameter are the same;
adding dummy data to each group of the code units determined to include less than the predetermined maximum number of code units, such that a number of the code units belonging to the each group of the code units is the predetermined maximum number; and
entropy coding in parallel the code units of the each group of code units grouped by the processor.

10. The method of claim 9, wherein the code units are grouped based on a plurality of same parameters of each of the code units, and wherein the values of the respective same parameters of the code units in the each group of code units grouped by the processor are the same.

11. The method of claim 9, wherein the code units include code blocks with which the at least one same parameter is associated.

12. The method of claim 11, wherein the at least one same parameter represents at least one of horizontal size, vertical size, sub-band type and calculated coding pass number.

13. The method of claim 9 further comprising:
arranging the groups of code units such that the code units of the each group of code units grouped by the processor can be entropy coded in parallel.

14. The method of claim 9 further comprising:
arranging coding data from entropy coding in parallel the coding units of the each group of code units grouped by the processor, into a predetermined arrangement, by deleting the coding data corresponding to the dummy data.

15. The method of claim 9 further comprising:
transforming image data representative of the image into coefficient data in each sub-band; and
dividing a region of the sub-band of the coefficient data into the code units.

16. The method of claim 15, wherein the coefficient data of the code units is coded at the same position in the group in parallel.

17. A non-transitory recording medium recorded with a computer-readable program executable by a computer for enabling the computer to perform image coding, the program comprising the steps of:
grouping code units corresponding to an image by comparing values of at least one same parameter of each of the code units and forming each group of code units with any number of code units not exceeding a predetermined maximum number, wherein each group of code units grouped includes code units of which all values of the at least one same parameter are the same;
adding dummy data to each group of the code units determined to include less than the predetermined maximum number of code units, such that a number of the code units belonging to the each group of the code units is the predetermined maximum number; and
entropy coding in parallel the code units of each group of code units grouped.

* * * * *